United States Patent
Jager et al.

[11] Patent Number: 5,848,858
[45] Date of Patent: Dec. 15, 1998

[54] MILLING CUTTER

[75] Inventors: Horst Jager, Nuremberg; Gebhard Muller, Furth, both of Germany

[73] Assignee: Kennametal Hertel AG, Germany

[21] Appl. No.: 693,074

[22] PCT Filed: Feb. 15, 1995

[86] PCT No.: PCT/EP95/00547

§ 371 Date: Sep. 24, 1996

§ 102(e) Date: Sep. 24, 1996

[87] PCT Pub. No.: WO95/22425

PCT Pub. Date: Aug. 24, 1995

[30] Foreign Application Priority Data

Feb. 19, 1994 [DE] Germany ............... G 94 02 775.7

[51] Int. Cl.⁶ .................................................. B23C 5/20
[52] U.S. Cl. ........................... 407/34; 407/46; 407/53; 409/232
[58] Field of Search ........................... 407/34, 35, 40, 407/43, 41, 46, 48, 51, 53, 54, 56, 66, 67, 69, 70, 100, 101, 102; 408/231, 232, 233; 409/232, 234

[56] References Cited

U.S. PATENT DOCUMENTS

| | | | |
|---|---|---|---|
| 3,091,138 | 5/1963 | Berry, Jr. | 407/46 X |
| 3,104,453 | 9/1963 | Greenleaf | 407/46 X |
| 4,522,538 | 6/1985 | Lindsay | 407/35 |
| 5,662,436 | 9/1997 | Bishop | 407/48 X |
| 5,667,343 | 9/1997 | Hessman et al. | 407/46 X |

*Primary Examiner*—Andrea L. Pitts
*Assistant Examiner*—Henry W. H. Tsai
*Attorney, Agent, or Firm*—John J. Prizzi

[57] ABSTRACT

A milling cutter is provided with a base body that can be driven in a rotating manner around its longitudinal axis. Support bodies are distributed over the surface of the base body and are supported from centrifugal forces by a base body stopper and are positioned in tension against the base body stopper. The base body has an end face with a central area and a peripheral area around the central area, which central area is recessed with respect to the peripheral area. The central area and peripheral area together forming a step which acts as the base body stopper. The support bodies comprise a counter-step which can interlock with the base body, and a mounting plate is positioned at the end face to support the support bodies.

20 Claims, 6 Drawing Sheets

MILLING CUTTER

BACKGROUND OF THE INVENTION

1. Field of the Invention.

The invention relates to a milling cutter having a base body that can be driven in a rotating manner around its longitudinal axis and support bodies that are distributed over the surface of the base body. The support bodies support cutting plates made of a hard cutting material. The support bodies are supported against centrifugal forces by a base body stopper which the support bodies are tensioned against.

2. Background Information.

In a prior art milling cutter disclosed in DE 40 03 862 A1 of the type mentioned at the beginning, the support bodies equipped with cutting plates lie individually in recesses made from the end face of the base body basically parallel to its longitudinal axis or to the axis of rotation of the milling cutter. In each recess, the support bodies are tensioned radially outwards against the wall of the recess by means of clamping devices that can be activated by the end face of the base body. This ensures a secure support against the centrifugal forces being exerted on the support bodies during operation. The recesses for the insertion of the support bodies must be bored or cut individually. This makes the milling cutter very complicated and costly to manufacture. Furthermore, the recesses for the insertion of the individual clamping devices must be widened on one side. This is because the clamping devices used here are clamping wedges, and the further steps for their arrangement require more complicated production steps.

OBJECT OF THE INVENTION

The object of the invention is to create a milling cutter of the type mentioned at the beginning having radial support for the support bodies against the centrifugal forces exerted, which milling cutter is easy to manufacture without compromising on its functioning. This objective is attained by providing a recessed central area surrounded by a raised peripheral area on an end face of the base body, with the recessed central area and the raised peripheral area together forming a step acting as the base body stopper. The support bodies are provided with a counter-step which interlocks with the base body step and is tensioned against the end face of the base body. A mounting plate is disposed at the end face of the base body and is provided with grooves. The grooves of the mounting plate open substantially radially outward and substantially interlock with the support bodies on the sides and rear.

SUMMARY OF THE INVENTION

The solution in accordance with the invention enables the central area, the peripheral area and the step formed between them to be easily completed in a single tensioning procedure. The same applies for the mounting plate, and the support bodies are also easy to manufacture. The milling cutter is therefore characterized by a particularly high degree of axial and concentric accuracy, due to the fact that the support body beddings are manufactured in the same tensioning procedure and therefore in one cut, so to speak. This procedure produces both the base as well as the bearing surfaces for all support bodies, i.e. for the cutting plates.

Due to their radial direction, the grooves of the mounting plate can be made precisely, with few notches in the stress direction, and relatively inexpensively by means of e.g. wire EDM.

Manufacture is made even simpler by making the peripheral area and the central area of the end face of the base body to be substantially parallel to each other and each substantially parallel to a longitudinal axis of the base body.

By having the step between the stepped surface forming the central area and the peripheral area form the surface area of a cylinder or a truncated cone with the axis of the base body forming the axis of the cone or cylinder, however, the basic design of peripheral area, central area and the step of the base body as well as of the opposite area of the mounting plate can be machined by rotation. Surface and cylindrical grinding of the surfaces of the base body and the mounting plate is then possible in a simple manner, which surfaces are preformed through the rotation process and which operate together.

By making the cone converge in the direction facing away from the base body so that the stepped surface forms an acute angle of slightly less than 90 degrees with the central area, it can substantially ensure a particularly secure tensioning of the support bodies against the base body. This tensioning provides for a higher degree of shifting security for the support bodies in the direction of the base body axis.

Tensioning the bases of the support bodies against the peripheral areas ensures a largely planiform bearing of the support bodies on the base body. This effect is further improved through positioning the support bodies level and in contact with the peripheral area.

Positioning the external flanks of the mold projection in surface contact with the stepped surface creates a largely planiform bearing of the support body on the base body which is also effective radially outwards against the centrifugal force.

The basic structural components allow for a simple screw tensioning of the support bodies penetrating the base body with a straining screw which straining screw forms an acute angle with the base body axis so that the support bodies are tensioned with their bases as well as their outer flanks.

Having the tension axes cut the central longitudinal planes of the support bodies has the effect of evenly tensioning the support body against the base body.

Positioning the support bodies on the base body so that their periphery-side flank ends, which bear the cutting plate, protrude from the exact radial position in the cutting direction is based on the presupposition that, in order to simplify manufacture of the support bodies, the cutting plates are arranged with their face approximately parallel to the support body flanks. This can result in a positive effective cutting angle, which favors chip formation and chip removal to the cutter axis and out of the cutting area of the cutting plates. This is of particular relevance for milling cutters driven at a high peripheral speed.

By providing an annular projection of the mounting plate concentric to the base body axis beyond the plane of the peripheral area of the base body in the direction of the central area and interlocking the peripheral surface of the annular projection with the stepped surface of the base body, the centering of the mounting plate against the base body is simplified and is automatically performed in assembly.

Providing a cylindrical peripheral surface can allow the annular projection to be produced in a particularly simple manner in one rotating procedure.

Positioning the end face of the mounting plate approximately in the plane tensioned by the cover surfaces of the support bodies can result in an extremely small distance between the end face of the cutter body, formed here through the mounting plate, and the work piece, with the result that no chips accumulate here, or a low air volume can be used to create a high air pressure, which is advantageous for radially blowing out the chips from the peripheral region of the milling cutter.

Providing penetration channels which penetrate the mounting plate and face substantially radially outward from top sides of the mounting plate can support the fault-free removal of the chips.

By providing a base body and a mounting plate with substantially similar outer diameters, the entire, multi-piece cutter body has a uniform effective diameter. This increases the efficiency of chip collection within and chip removal out of the peripheral region of the milling cutter. Due to the uniform effective diameter, the milling cutter can be easily used in combination with a collection device for the chips.

By providing a chip space facing outward on the peripheral surface of the base body and the mounting plate, which chip space extends to the end face of the mounting plate, and is placed in front of the cutting plate surface in the rotational direction of the milling cutter, the chip spaces for the direct collection and removal of chips can be arranged at a particularly efficient position in the vicinity of the cutting plate edges in the operating position. In combination with the available centrifugal forces, this automatically sucks up the chips in the peripheral direction.

Tensioning the mounting plate against the peripheral area of the base body with the end face extending beyond the annular projection can allow for a particularly vibration-free connection between the mounting plate and the base body.

Positioning the straining screws so that the clamping flanks of the straining screws are tensioned against grooves of the mounting plate can cause the support bodies can be effectively supported in a planiform manner against the three cutting-pressure components operating on them, wherein the additional clamping-flank support ensured here operates against the particularly significant main cutting pressure.

By providing the grooves on the mounting plate to taper radially outwards in a cone like manner, the support bodies are additionally supported against the centrifugal force operating on them by means of the mounting-plate grooves.

BRIEF DESCRIPTION OF THE DRAWINGS

The invention is explained in greater detail with an exemplary embodiment shown in the figures. This shows.

DESCRIPTION OF THE PREFERRED EMBODIMENT

Figure 1:
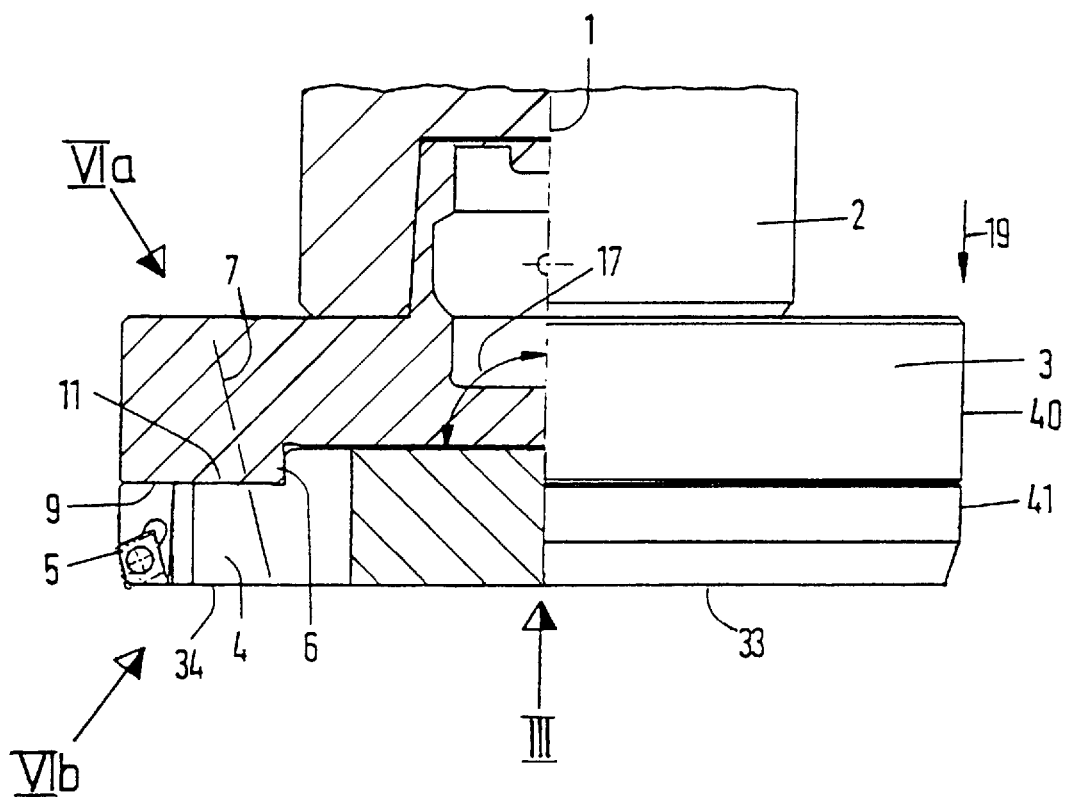
FIG. 1 a main side view—partially in cross-section—of the milling cutter approximately along the cross-section line I—I in FIG. 3, FIG. 2 a diametrical section along the cross-section line II—II in FIG. 3, FIG. 3 a top view of the lower working end of the milling cutter in the viewing direction from arrow III in FIGS. 1 and 2, FIG. 4 a top view of the mounting plate forming the working end of the milling cutter, also in the viewing direction from arrow III in FIGS. 1 and 2, FIG. 5 a side view—partially in cross-section—of the milling cutter circumference in the region of a support body equipped with a cutting plate, approximately in the direction of arrow V of FIG. 3, FIG. 6a a magnified cross-sectional view of the peripheral-side end of the base body in area VI of FIG. 1, FIG. 6b a magnified illustration of the support body, equipped with a cutting plate and tensioned on the base body, of area VI from FIG. 1, FIG. 7 a schematic top view of a support body equipped with a cutting plate with the viewing direction towards the face of the cutting plate in the viewing direction VII from FIG. 8, FIG. 8 a side view in the direction of arrow VIII from FIG. 7, FIG. 9 a diametrical cross-section through the milling cutter similar to FIG. 2 in combination with a chip-removal device surrounding the entire milling cutter, FIG. 10 a top view of the working area of the unit in the viewing direction of arrow X from FIG. 9.

The milling cutter essentially comprises the base body 3, which can be driven in a rotating manner around its longitudinal axis 1 through the machine tool spindle 2, and support bodies 4 which are distributed over the surface of the latter and are intended for cutting plates 5 made of a hard cutting material. The support bodies 4 are supported by means of a stopper in the base body 3 against the centrifugal force operating on them radially to the longitudinal axis 1. The support used here is the step 6 implemented against the centrifugal force. The support bodies 4 are tensioned against the base body 3 and specifically against the step 6. The tensioning is basically made in the direction of the clamping axis 7.

Figure 6A:
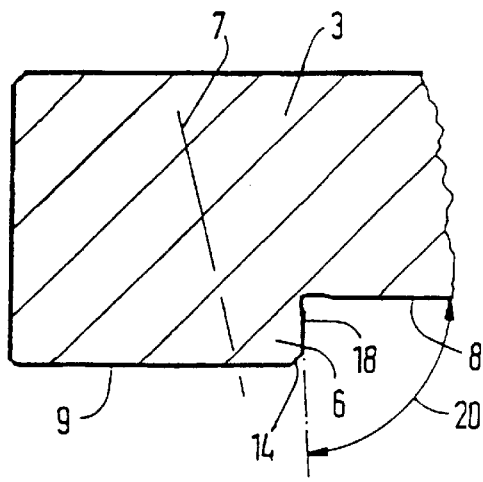

The end face of the base body 3 is formed through a central area 8 and through a peripheral area 9 surrounding this in a collar-like manner (FIG. 6a). The height of the peripheral area 9 projects beyond the height of the central area 8 in the direction of the longitudinal axis 1 against the work piece 10 to be machined. The central area 8 and the peripheral area 9 form between each other the step 6 which functions as the base body stopper. The support bodies 4 form at their base 11 a counter-step 12, which cooperates in an interlocking manner with the step 6 of the base body 3. The support bodies 4 are tensioned with their counter-step 12 against the end face of the base body 3 in the direction of the clamping axis 7 such that the counter-step 12 is drawn with its inner insert 13 to the step edge 14 (FIG. 6a) in such a way that the step edge 14 exerts pressure in a wedge-like manner on the insert 13 of the counter-step 12.

Figure 3:
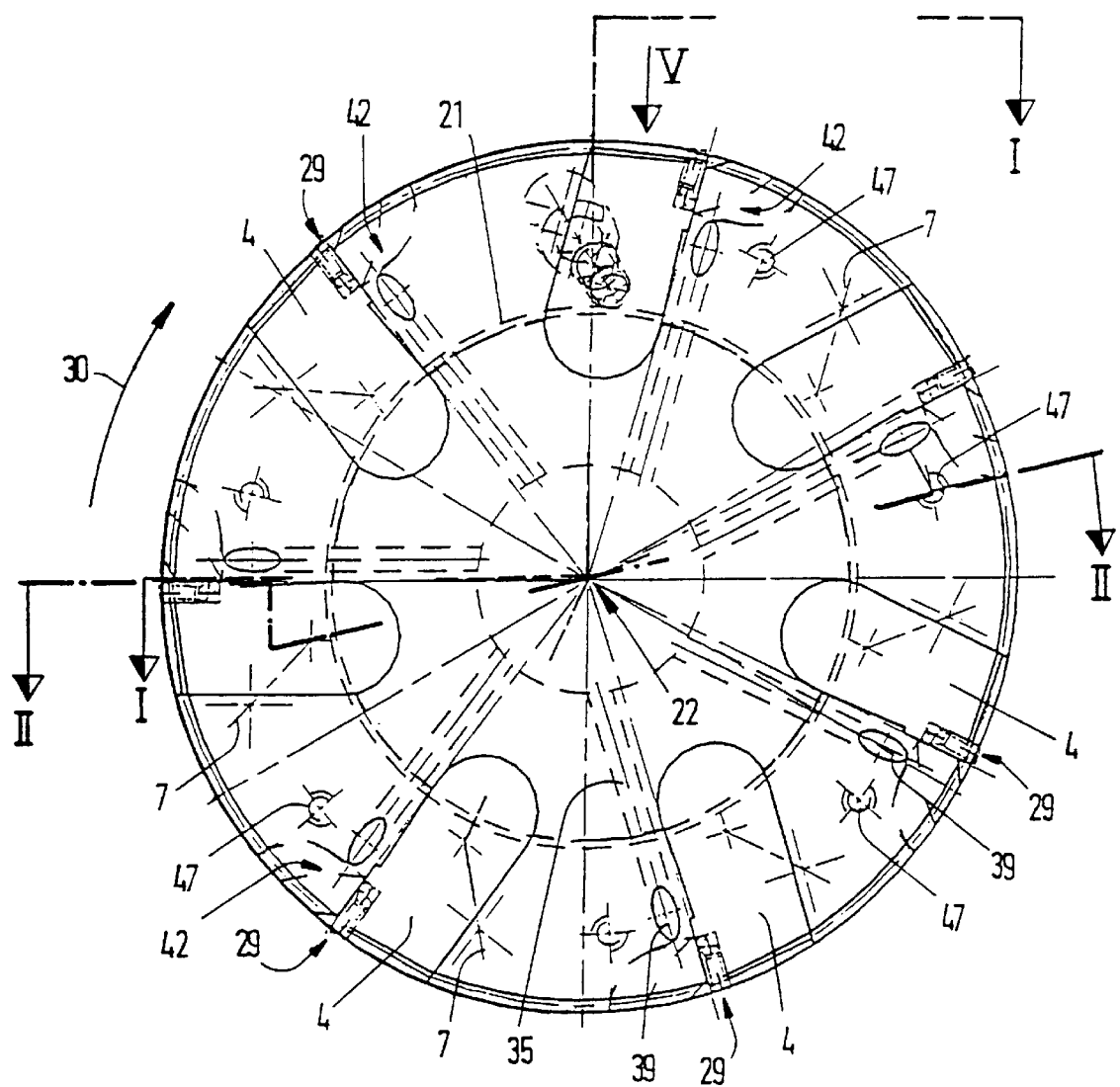
Figure 4:
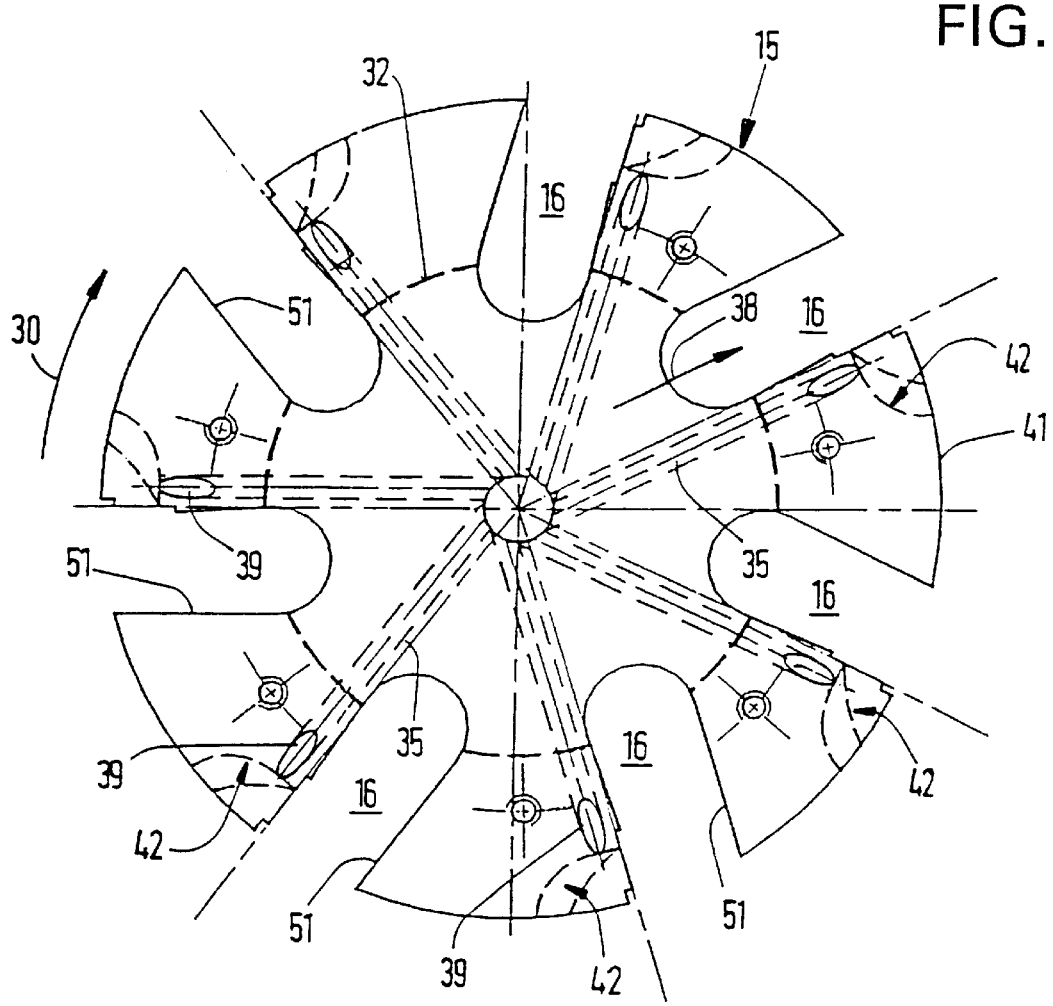

A mounting plate 15 is disposed at the end face of the base body 3, said end face being formed by the central area 8 and the peripheral area 9. Using the grooves 16 which are arranged on its circumference and are open approximately radially outwards, the mounting plate 15 embraces the support bodies 4 lying in the grooves 16 at the sides and the rear in an interlocking manner (FIG. 3). The grooves 16 thereby operate in the manner of pockets filled with the support bodies 4.

The central area 8 and the peripheral area 9 are level and run parallel to each other. They are at a right angle 17 to the longitudinal axis 1 of the base body 3.

Figure 6B:
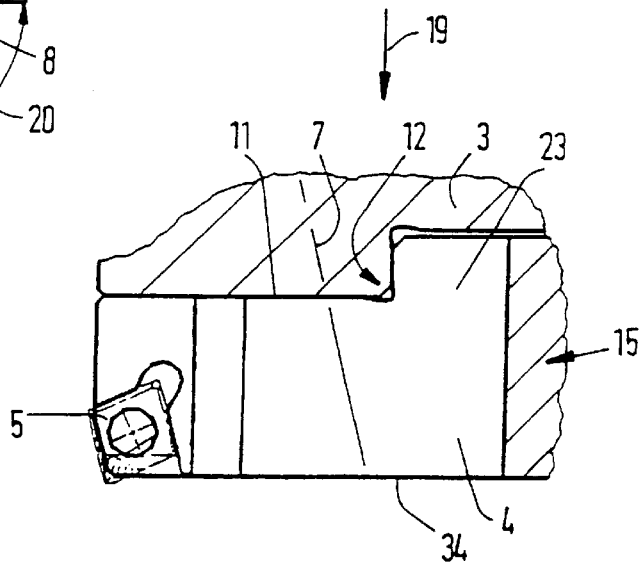
Figure 7:
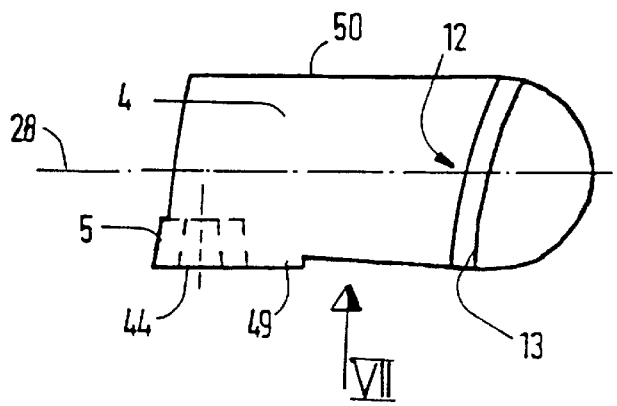
Figure 8:
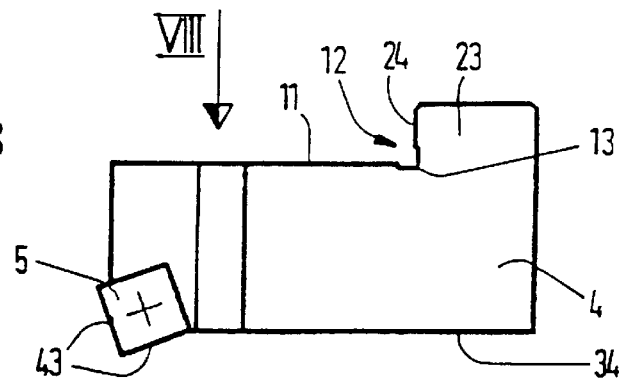

The step 6 between the central area 8 and the peripheral area 9 contains a stepped surface 18 (FIG. 6a). It is formed by the surface area of a cylinder. Due to the improved interlocking bond, i.e. the more efficient shifting security in the direction of the longitudinal axis 1, the stepped surface 18 is provided with an undercut, which is most easily formed by the surface area forming—instead of a cylinder—a truncated cone, with the longitudinal axis 1 of the base body 3 forming the cone axis. The cone forming this surface area tapers in the direction of the work piece 10, i.e. in the direction of the arrow 19 (FIGS. 1 and 6). Due to the fact that the stepped surface 18 has this advantageous cone surface area, it—together with the peripheral area 9—forms an angle 20 of less than 90° with the central area 8. The step 6 in the base body 3 runs concentric to the longitudinal axis 1. The stepped edge 14 thereby forms a circle 21 around the central point 22 of the milling cutter (FIG. 3), i.e. around the longitudinal axis 1.

The support bodies 4 are tensioned with their bases 11 against the peripheral area 9 of the base body 3. The bases 11 of the support bodies 4 are level and lie with surface contact on the peripheral area 9. The counter-steps 12 of the support bodies 4 are formed through a mold projection 23 extending beyond the support body base 11. The flanks 24 of the mold projections 23, which flanks lie approximately radially outwards when the support bodies 4 are in the mounted position, have a surface structure that complements the stepped surface 18 of the base body 3 such that they lie with surface contact on the stepped surface 18.

Figure 2:
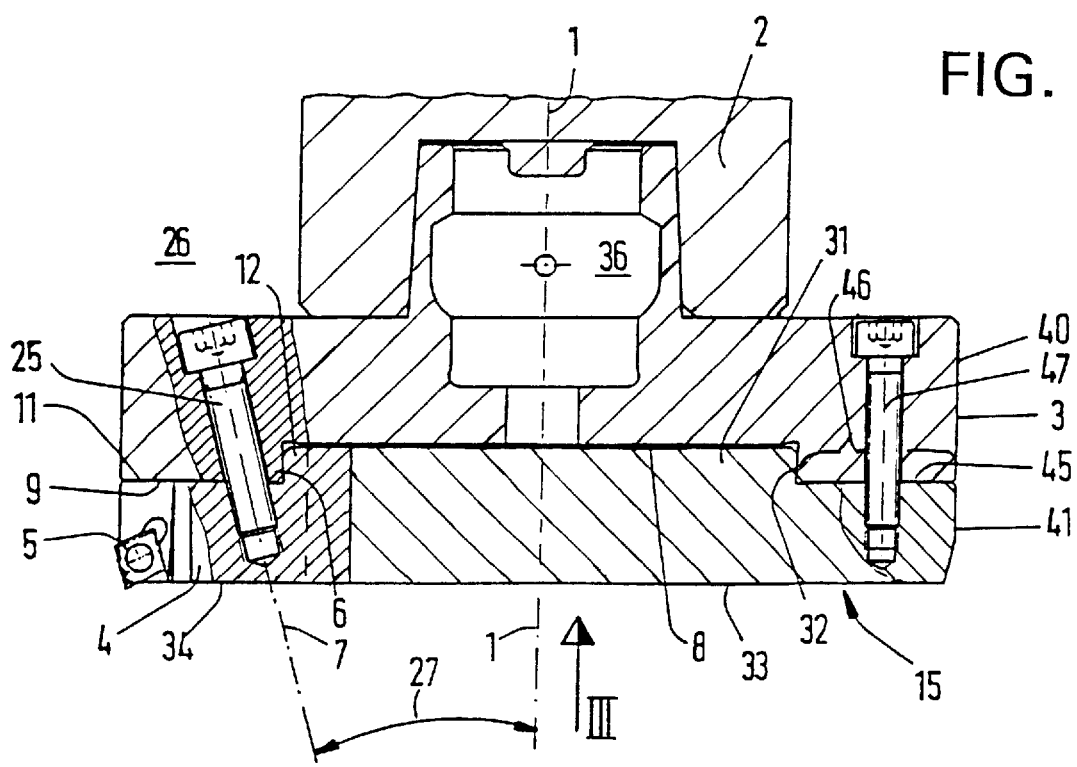

The support bodies 4 are each tensioned by one straining screw 25 (FIG. 2) with the base body 3. The straining screw 25 permeates the base body 3 from the driving side 26 facing away from the support body 4, and it can also be operated from the driving side 26 of the base body 3 which projects radially beyond the machine tool spindle 2 in a flange-like manner. The clamping axes 7 of the straining screws 25 form with the longitudinal axis 1 of the base body an acute angle 27 opening to the driving side 26. The support bodies 4 are thereby tensioned both with their bases 11 as well as with the outer flanks 24 of their mold projections 23 against their opposite areas 9,18 on the base body 3. The clamping axes 7 of the straining screws 25 cut the support bodies 4 approximately in the region of their central longitudinal plains 28.

The support bodies 4 are positioned on the base body 3 with their central longitudinal plains 28 divergent from an exact radial position to the longitudinal axis 1 of the base body 3 such that their flank end 29 on the peripheral side, bearing the cutting plate 5, projects beyond the exact radial position in the rotational direction 30 (FIG. 3).

The mounting plate 15 protrudes with an annular projection 31, which is concentric to the longitudinal axis 1 of the base body 3, beyond the level of the peripheral area 9 of the base body 3 in the direction of its central area 8. With its approximately cylindrical peripheral surface 32, the annular projection 31 fits perfectly in an interlocking manner on the stepped surface 18 of the base body 3.

Figure 9:
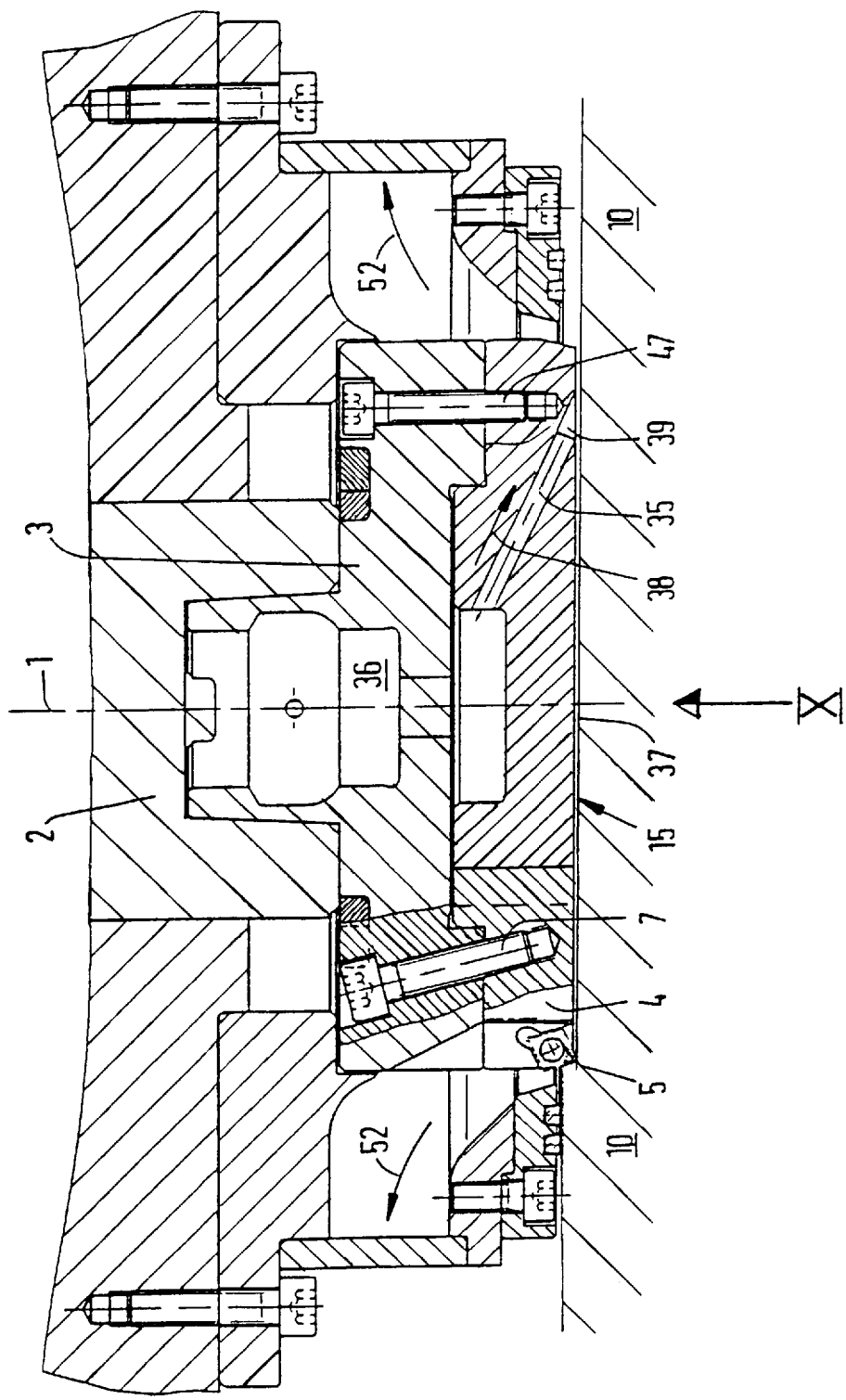

The end face 33 of the mounting plate 15 lies approximately on the plane tensioned by the cover surfaces 34 of the support bodies 4. In a preferred embodiment, the mounting plate 15 is permeated by penetration channels 35 for compressed air (FIG. 9). The compressed air is blown through the penetration channels 35 from the inside out of the central region 36 of the base body 3 to the outside in the direction of the construction joint 37 between the work piece 10 and the milling cutter. The blowing direction 38 is thereby basically radially towards the outside. The penetration channels 35 flow into the region of their apertures 39 in the construction joint 37. The blowing direction 38 is towards the cutting plates 5, i.e. towards the flank ends 29 of the support bodies 4.

Figure 5:
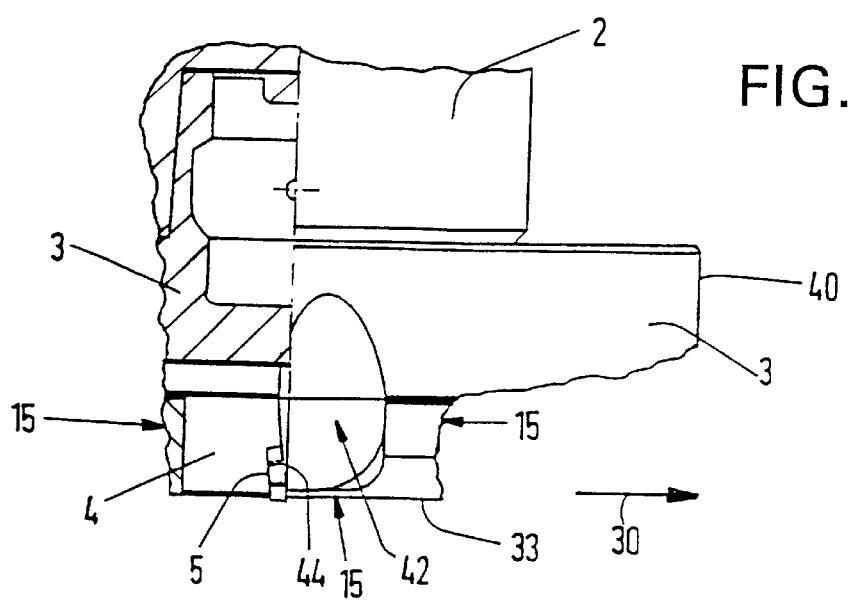

On the peripheral surface 40 of the base body 3 and the same-sized peripheral surface 41 of the mounting plate 15, each support body 4 is associated with a separate chip space 42, opening outwards (FIG. 5). The chip space 42 extends as far as the end face 33 of the mounting plate 15 and thereby covers at least part of the cutting-plate surface 44 containing the cutting edges 43. The chip spaces 42 are arranged in the rotational direction 30 of the cutting-plate surface 44.

The mounting plate 15 is tensioned with the front end 45 of its flange-like peripheral region 46 protruding radially beyond the annular projection 31 against the parallel peripheral area 9 of the base body 3. The fixing screws 47 are screwed in from the driving side 26 of the base body 3 into the mounting plate 15. The clamping axes 7 of the straining screws 25 for the support bodies 4 run at an angle to the longitudinal axis 1 of the base body 3. The support bodies 4 are tensioned with their clamping flanks 50 opposite the relevant cutting-plate flanks 49 against the counter-flanks 51 of the associated grooves 16 of the mounting plates 15. The grooves 16 of the mounting plates 15, which grooves embrace the support bodies 4 in an interlocking manner taper radially outwards in a slightly cone-like manner.

Figure 10:
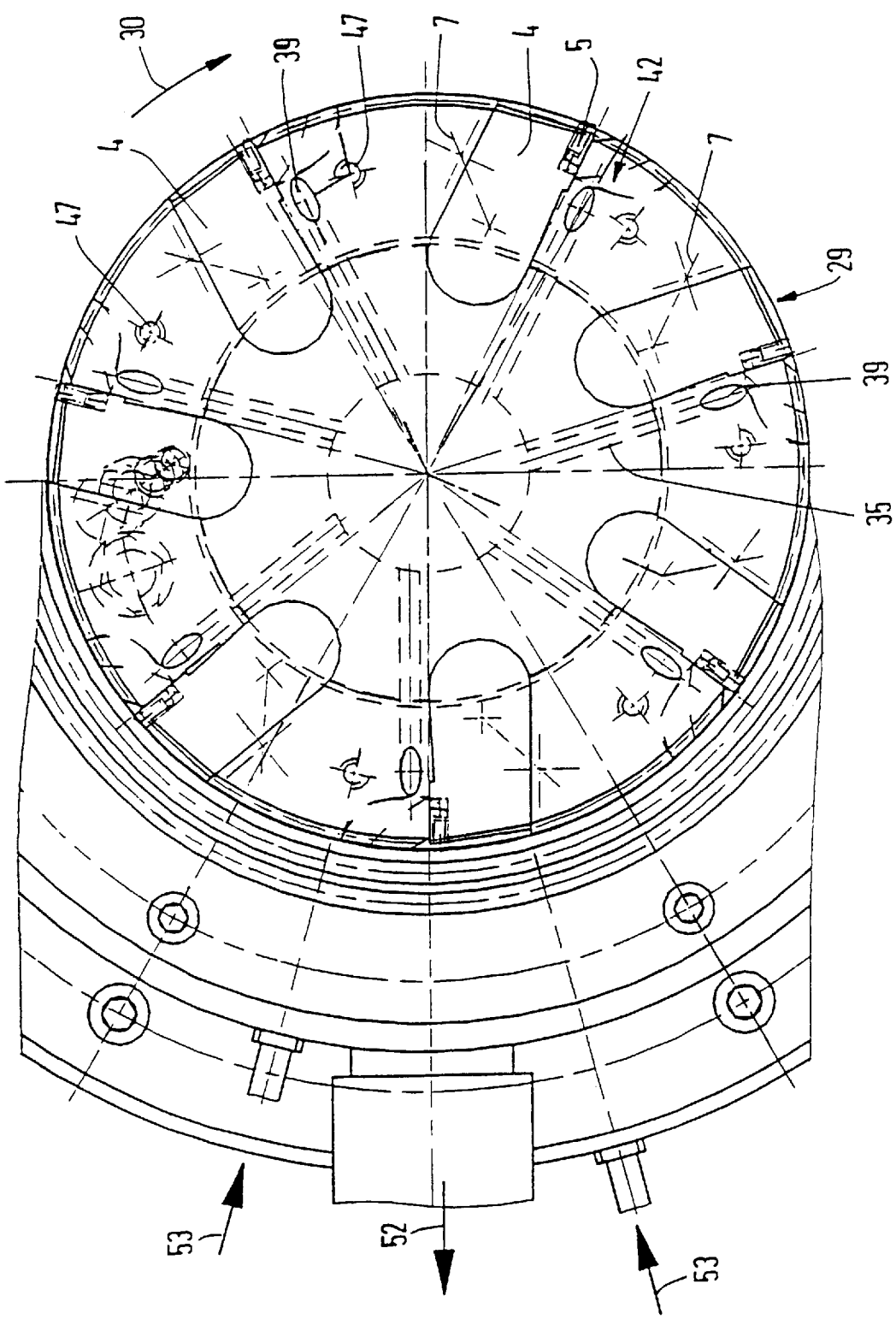

FIGS. 9 and 10 show the milling cutter in accordance with the invention as a unit with the surrounding housing of a device for removal or suction of the chips. Compressed air is blown basically radially outwards via the machine tool spindle 2, or the central region 36 of the base body 3, through the penetration channels 35, out of the apertures 39 into the working level, or the construction joint 37. Due to the blowing direction 38, the chips arising in the region of the cutting plates 5 are forced into the region of the peripheral surface 40, 41 of the base body 3 and the mounting plate 15, where chip spaces 42 are arranged on the cutter surface for their reception. From there, the chips are sucked up, basically radially outwards, in the direction of the arrow 52. A sucking action is already attained through the centrifugal force arising as a result of the rotating movement of the cutter head. This centrifugal force is supported and strengthened through the suction applied in the direction of the arrow 52, or through the compressed air introduced into the milling cutter in the direction of the arrow 53.

The milling cutter in accordance with the invention is particularly suitable for high rotating speeds with correspondingly high centrifugal forces.

We claim:

1. A milling cutter comprising:

a base body, said base body having a longitudinal axis, and being rotatable about the longitudinal axis;

said base body having an end surface;

a plurality of cutting plates comprising a hard cutting material;

a plurality of support bodies to support said plurality of cutting plates;

said plurality of support bodies being disposed on said end surface of said base body;

said end surface of said base body comprising a central area and a peripheral area, said peripheral area being disposed substantially radially about said central area;

said central area being recessed with respect to said peripheral area;

said recessed central area and said peripheral area forming a step;

said step being disposed to hold said plurality of support bodies against centrifugal force upon rotation of said base body about the longitudinal axis;

said plurality of support bodies being tensioned against said step;

each of said plurality of support bodies comprising a portion configured to fit against said step;

said portion to fit against said step of each of said plurality of support bodies being disposed to interlock with said step of said end surface of said base body;

a mounting plate;

said mounting plate being disposed adjacent said end surface of said base body;

said mounting plate comprising a plurality of grooves;

said plurality of grooves extending substantially radially outward from the longitudinal axis;

each of said plurality of support bodies having a rear surface and two side surfaces, said two side surfaces being disposed opposite one another; and said plurality of grooves being disposed to substantially interlock with said plurality of support bodies on said rear and said two side surfaces.

2. The milling cutter according to claim 1 wherein:

said peripheral area of said end surface of said base body is substantially transverse to the longitudinal axis;

said central area of said end surface of said base body is substantially transverse to the longitudinal axis; and said peripheral area and said central area are substantially parallel to each other.

3. The milling cutter according to claim 1 wherein:

said step comprises a surface substantially parallel to the longitudinal axis, said surface extending between said peripheral area and said central area; and said surface of said step forming one of:
   a) a cylinder, said cylinder being coaxial with said base body; and
   b) a truncated cone, said truncated cone being coaxial with said base body.

4. The milling cutter according to claim 3 wherein:

said surface of said step forms said truncated cone;

said surface forms an angle with respect to said central area; and the angle of said surface with respect to said central area is an acute angle.

5. The milling cutter according to claim 3 wherein:

each of said plurality of support bodies comprises a base;

said base of each of said support bodies comprises a portion; and said portion of said base of each of said support bodies is tensioned toward said peripheral area of said end surface of said base body.

6. The milling cutter according to claim 5 wherein:

said portion of said base of each of said support bodies comprises a substantially flat surface; and said substantially flat surface of said portion of each of said support bodies is disposed in direct contact with said peripheral area of said base body.

7. The milling cutter according to claim 5 wherein:

each of said support bodies comprises a projection;

said projection of each of said support bodies being disposed nearer the longitudinal axis than said portion of said base of each of said support bodies; and said projection of each of said support bodies being disposed to project toward said central area of said end surface of said base body.

8. The milling cutter according to claim 7 wherein:

each of said projections of each of said support bodies comprises a surface;

each said surface of each of said projections of each of said support bodies is disposed facing away from the longitudinal axis; and each said surface of each said projection of each of said support bodies is disposed adjacent said surface of said step.

9. The milling cutter according to claim 8 comprising:

a plurality of straining screws, each of said plurality of straining screws corresponding to one of said plurality of support bodies;

each of said straining screws being disposed to bias its corresponding support body;

each of said straining screws having a screw head and a shaft;

said screw head of each of said straining screws being disposed in said base body;

at least a portion of said shaft of each of said straining screws being disposed in its corresponding support body; and each of said straining screws being disposed to form an acute angle with respect to the longitudinal axis of said base body to tension said support bodies against said base body.

10. The milling cutter according to claim 9 wherein:

each of said support bodies has a central longitudinal plane;

each of said straining screws has a shaft axis along its shaft; and the shaft axis of each of said straining screws is disposed through the central longitudinal plane of each of said support bodies.

11. The milling cutter according to claim 10 wherein:

the central longitudinal plane of each of said support bodies is disposed at a non-perpendicular angle with respect to the longitudinal axis of the base body; and each of said support bodies is disposed to extend said cutting plates away from said base body.

12. The milling cutter according to claim 1 wherein:

said mounting plate comprises a projecting portion;

said projecting portion of said mounting plate comprises a peripheral surface; and said projecting portion of said mounting plate is disposed against said central area of said base body.

13. The milling cutter according to claim 12 wherein said peripheral surface of said projecting portion of said mounting plate is substantially cylindrical.

14. The milling cutter according to claim 13 wherein:

each of said support bodies comprises a cover surface;

said cover surface of each of said support bodies is disposed to face substantially away from end surface of said base body;

said mounting plate has an end face; and said end face of said mounting plate is substantially coplanar with said cover surfaces of said support bodies.

15. The milling cutter according to claim 14 wherein:

said mounting plate has an outer diameter;

said base body has an outer diameter; and the outer diameter of said base body is substantially equal to the outer diameter of said mounting plate.

16. The milling cutter according to claim 15 wherein:

said peripheral area of said base body comprises a plurality of chip spaces;

each of said said chip spaces are disposed to correspond to one of said plurality of cutting plates;

each of said chip spaces are disposed adjacent said end face of said mounting plate;

said base body having a direction of rotation about the longitudinal axis; and each of said plurality of chip spaces is disposed ahead of its corresponding cutting plate in the direction of rotation of the base body.

17. The milling cutter according to claim 16 wherein said mounting plate is tensioned against said peripheral area of said base body.

18. The milling cutter according to claim 17 comprising:

a plurality of fixing screws; and a portion of each of said plurality of fixing screws being disposed in said base body and a second portion of each of said plurality of fixing screws being disposed in said mounting plate.

19. The milling cutter according to claim 18 comprising:

a plurality of straining screws, each of said plurality of straining screws corresponding to one of said plurality of support bodies;

each of said straining screws being disposed to bias its corresponding support body; each of said straining screws having a screw head and a shaft;

said screw head of each of said straining screws being disposed in said base body;

said shaft of each of said straining screws being disposed into its corresponding support body; and each of said straining screws being disposed to form an angle with respect to the longitudinal axis of said base body and to thereby tension said cutting plates against said grooves of said mounting plate.

20. The milling cutter according to claim 19 wherein said grooves of said mounting plate have a tapered contour, said tapered contour opening substantially radially outward from the longitudinal axis.

* * * * *